United States Patent
Egedal

(10) Patent No.: US 8,426,996 B2
(45) Date of Patent: Apr. 23, 2013

(54) METHOD FOR CONTROLLING WIND TURBINES, AND DEVICES THEREFORE

(75) Inventor: Per Egedal, Herning (DK)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 13/365,374

(22) Filed: Feb. 3, 2012

(65) Prior Publication Data

US 2012/0133139 A1   May 31, 2012

Related U.S. Application Data

(63) Continuation of application No. 12/288,526, filed on Oct. 21, 2008, now Pat. No. 8,154,139.

(30) Foreign Application Priority Data

Oct. 23, 2007 (EP) .................................. 07020720

(51) Int. Cl.
*F03D 9/00* (2006.01)
(52) U.S. Cl.
USPC ......................................................... 290/44
(58) Field of Classification Search .................. 290/44, 290/55; 415/1; 416/1; 700/286–287
See application file for complete search history.

(56) References Cited

U.S. PATENT DOCUMENTS

| | | | | |
|---|---|---|---|---|
| 4,934,825 A * | 6/1990 | Martin | ............................ | 701/99 |
| 7,160,083 B2 * | 1/2007 | Pierce et al. | .................... | 416/61 |
| 7,452,185 B2 * | 11/2008 | Ide et al. | ......................... | 416/35 |
| 2007/0182162 A1 * | 8/2007 | McClintic | ....................... | 290/55 |
| 2008/0290664 A1 * | 11/2008 | Kruger | ............................. | 290/55 |
| 2010/0014969 A1 * | 1/2010 | Wilson et al. | ..................... | 416/1 |

FOREIGN PATENT DOCUMENTS

JP    08061956 A  *  3/1996

* cited by examiner

*Primary Examiner* — Tran Nguyen
*Assistant Examiner* — Eric Johnson

(57) ABSTRACT

A wind turbine control master unit has a communication interface and a signal processing unit. The communication interface is configured to receive a rotor rotational speed of at least a first and a second wind turbine over a communication link. The signal processing unit is configured to determine a synchronized rotor speed value based on a mean value of the rotor rotational speeds. The signal processing unit is configured to calculate a synchronized azimuth angle value based on integrating the synchronized rotor speed value. Further, the communication interface is configured to send the synchronized rotor speed value and the synchronized azimuth angle value over a communication link. Also, a signal light control module and a wind turbine in connection with the control master unit are provided.

6 Claims, 6 Drawing Sheets

METHOD FOR CONTROLLING WIND TURBINES, AND DEVICES THEREFORE

CROSS REFERENCE TO RELATED APPLICATIONS

This application is a continuing application of U.S. non-provisional application Ser. No. 12/288,526 US filed Oct. 21, 2008, now U.S. Pat. No. 8,154,139 which claims priority of European Patent Office application No. 07020720.4 EP filed Oct. 23, 2007. All of the applications are incorporated by reference herein in their entirety.

FIELD OF INVENTION

The invention relates to a method for controlling the rotational speeds of wind turbines, and a wind turbine control master unit, a wind turbine control slave unit, a wind turbine control device, a signal light control module, and a wind turbine therefore.

BACKGROUND OF INVENTION

In arrangements of wind turbines in a wind turbine park, oftentimes wind flow conditions for individual wind turbines do not differ significantly. This is particularly true for off-shore wind turbine parks, where typically turbulence is very low. Consequently, differences in rotor rotational speed between individual wind turbines are low, and, at the same time, the rotor rotational speed of each individual wind turbine is relatively constant.

For controlling the rotor rotational speed of a wind turbine, two main approaches are known in the art. The first is braking, either with electrical or mechanical means. The second is to modify the blade pitch, that is, to increase or decrease the angle of attack, i.e. the angle at which the wind strikes the rotor blades. This is typically performed with actors on a hydraulic or electric basis.

In spite of relatively uniform wind flow conditions and the means for rotation control known in the art, parks of horizontal-axis wind turbines require a significant amount of measurement and data processing for applications that are dependent on the azimuth angles of the wind turbines, with the azimuth angle being the angle of rotation of the rotor around the axis perpendicular to the plane of the rotor blades. For each such application, each individual azimuth angle is measured and subject to calculations specific to the application, which can in turn lead to a significant computational load and a relatively high control complexity.

WO 01/97359 A1 describes a method and device for stabilising power generated by groups of generators wind turbines. The method and the device generally aim to offset the phase angles of rotating rotors of wind turbines, or groups of wind turbines, relative to each other. In case wind turbines of a wind park are grouped into different groups of wind turbines the wind turbines of a group may be synchronized. However, phase shifts are introduced between the groups of wind turbines of a wind farm in order to avoid occurrence of so called singularity phase angles of different groups of wind turbines at the same time.

DE 101 64 524 A1 and WO 2007/068254 A1 describe warning lights at the blade tips of a wind turbine rotor.

EP 1 835 293 A1 describes a method of determining at least one rotation parameter of a wind turbine rotor on the bases of variations in measured effective centrifugal forces due to gravitational influence.

The article "Obstacle Markings on Wind Turbines for Save Aviation and Marine Navigation" by Björn Montgomerie, FOI memorandum, Swedish Defence Research Agency SE, number 979 (Aug. 1, 2008) pages 1 to 10 describes illumination of a wind turbine at the highest point. Lights are provided at blade tips which undergo and on/off circle.

SUMMARY OF INVENTION

It is an object of the present invention to provide a method for controlling the rotational speeds of wind turbines in a way to reduce the amount of measurement and data processing for applications that are dependent on the azimuth angle of the wind turbines, as well as a wind turbine control master unit, a wind turbine control slave unit, a wind turbine control device, a signal light control module, and a wind turbine therefore.

This object is achieved by the subjects of the independent claims.

A method for controlling the rotational speeds of wind turbines, comprises the steps of: determining the rotor rotational speed of at least a first and a second wind turbine; determining the rotor azimuth angle of at least the first and the second wind turbine; calculating a speed control value for at least the first wind turbine, based on the determined rotor azimuth angles and rotor rotational speeds; adjusting the rotor rotational speed of at least the first wind turbine according to its speed control value, wherein the speed control value is calculated such that the rotor azimuth angle of at least the first wind turbine is equal to the rotor azimuth angle of the second wind turbine or such that the rotor azimuth angle of at least the first turbine is equal to modulus [(360 degrees) divided by (the number of blades)] of the rotor azimuth angle of the second wind turbine of the second wind turbine after speed adjustment. A second speed control value is calculated for the second wind turbine, based on the determined rotor azimuth angles and rotor rotational speeds, and the rotor rotational speed of the second wind turbine is adjusted according to its speed control value. Calculating the speed control value comprises determining a synchronized rotor speed value based on a mean value of the rotor rotational speeds.

Thus, all rotors in a wind turbine park may be synchronized to a specifically selected target value for optimization purposes. Here the target value is specifically selected to be mean value of the rotor rotational speeds, or a value that is calculated on the basis of this mean value and is the result of further calculations.

By calculating the speed control value based on current rotor rotational speeds and azimuth angles in the specified manner, state-of-the-art rotation control means can be used to adjust the rotation speed of each individual wind turbine such that, during a transient phase, individual rotor speeds and azimuth angles converge until the rotors are in sync. (Two rotors are in sync if any one of the blade tips of a first rotor is in a top position at the same time as any one of the blade tips of a second rotor. In this state, the azimuth angles of the rotors are considered to be equal).

The target rotational speed and target azimuth value that is to be reached in the state of synchronization can be specifically selected, or can be the rotational speed and azimuth of one of the turbines in the wind turbine park. A number of individual speed control values can be calculated, each for one wind turbine of a group of first wind turbines which all individually adjust their speed and azimuth to be in sync with the second wind turbine.

In the case of specifically selected target rotational speed and target azimuth values, the values may be selected such that the transient phase of convergence is minimized, or according to other optimization criteria. In this case, the rotational speed and azimuth of the (at least one) first wind turbine is adjusted with the help of a suitably calculated speed control value, so that the synchronization criteria are met, and the invention then may be embodied such that a second speed control value is calculated for the second wind turbine, based on the determined rotor azimuth angles and rotor rotational speeds, and the rotor rotational speed of the second wind turbine is adjusted according to its speed control value.

In this manner, the invention provides for a generally uniform rotor rotational speed and rotor azimuth angle for all the thus controlled wind turbines in a wind turbine park. This reduces complexity for applications that depend on the azimuth angles of the rotors, since it is sufficient to only determine and process one azimuth angle. Thus, measurement and computational complexity is dramatically reduced for such applications.

This invention may be applied to both horizontal axis wind turbines and vertical axis wind turbines.

Further embodiments of this aspect of the invention can be characterized by the features provided in the claims referring to the independent claims.

The method may further embodied such that determining the synchronized rotor speed value comprises calculating a mean value of the speed control values and adding the mean value of the speed control values to the mean value of the rotor rotational speeds. This embodiment may include applying a gain coefficient to the mean value of the speed control values before adding. This adding of the (gain modified) mean value of the speed control values provides a feedback loop ensuring that the mean value of the speed control values generated in the method for all the wind turbines is at or near zero.

In an embodiment, calculating the speed control value comprises comparing the synchronized rotor speed value with the determined rotor rotational speed, thus obtaining a speed difference value. Such an embodiment can further be elaborated in that calculating the speed control value comprises PI processing (Proportional gain and Integrating processing) the speed difference value, thus obtaining a first speed offset value. Thus, rather than generating the speed control value in the form of an absolute reference value that the individual wind turbines adjust their rotor speed to, the speed control value is provided as an offset value, and the individual wind turbines may add this offset value to the speed setpoint value stored in their local control unit. Thus, not only the speed control value is minimized, but also the invention integrates well with well-established types wind turbines with on-board rotation control.

In embodiments of the method, calculating the speed control value may include determining a synchronized azimuth angle value based on integrating the synchronized speed value.

Thus, in realizations of the method, calculating the speed control value may include comparing the synchronized azimuth angle value with the determined rotor azimuth angle, thus obtaining an angle difference value. If the method is embodied such that calculating the speed control value comprises PI processing the angle difference value, thus obtaining a second speed offset value, the method can be realized to calculate the speed control value comprising adding the first and second speed offset value.

In some embodiments, the speed control value is added to a speed setpoint value stored in the wind turbine.

In an embodiment of the method, suited for horizontal axis wind turbines in particular, a signal light, located at the blade tip of the wind turbine, is activated upon the blade being in approximately a top position. Positioning the aviation signal light at the end of the blade tips, rather than on top of the nacelle, where the aviation signal light may interfere with air flow measurements, the embodiment thus allows measurement interference to be reduced, and also allows the maximum height of the wind turbine to be indicated more accurately.

Calculation efforts for determining the next point of time when the signal light is to be activated are reduced in embodiments of present invention where a synchronized flash time value is calculated based on the synchronized rotor speed value and the synchronized azimuth angle value. As a person skilled in the art will appreciate, this is specifically enabled by the synchronization. Thus, the signal light can be activated upon a clock in a wind turbine reaching the synchronized flash time value, where the time value may be embodied to comprise a time stamp.

A wind turbine control master unit for use with the method, comprises a communication interface and a signal processing unit, wherein the communication interface is configured to receive a rotor rotational speed of at least a first and a second wind turbine over a communication link; the signal processing unit is configured to determine a synchronized rotor speed value based on a mean value of the rotor rotational speeds; the signal processing unit is configured to calculate a synchronized azimuth angle value based on integrating the synchronized rotor speed value; and the communication interface is configured to send the synchronized rotor speed value and the synchronized azimuth angle value over a communication link.

In contrast to a configuration with a central control device, this turbine control master unit is designed to work with a plurality of slave control units in a master/slave configuration.

In such a configuration, certain parts of the method are not being carried out at a central node (the master, in a master/slave configuration) but at a plurality of peripheral nodes (slaves), the number of which may, but need not, immediately correspond to the number of controlled wind turbines. In this manner, scalability and maintainability of the overall system is improved in a significant manner as compared to a centralized approach.

Embodiments of this aspect of the invention may comprise the features provided in the claims referring back to the independent claims, as well as further configurations to carry out the method and its embodiments, as explained.

In an embodiment of the master unit, the communication interface is further configured to receive speed control values of at least the first and second wind turbine over a communication link. Thus, the signal processing unit can be configured to add a mean value of the speed control values to the synchronized rotor speed value.

A wind turbine control slave unit for use with the wind turbine control master unit, comprises a communication interface and a signal processing unit, wherein the communication interface is configured to receive a synchronized rotor speed value and a synchronized azimuth angle value over a communication link; the signal processing unit is configured to obtain a rotor azimuth angle and a rotor rotational speed; the signal processing unit is configured to compare the synchronized rotor speed value with the rotor rotational speed, thus obtaining a speed difference value; the signal processing unit is configured to compare the synchronized azimuth angle value with the rotor azimuth angle, thus obtaining an angle difference value; the signal processing unit is configured to calculate a speed control value based on the speed difference value and the angle difference value; and the communication interface is configured to send the speed control value and the rotor rotational speed over a communication link.

Embodiments of this aspect of the invention may comprise the features provided in the claims referring back to the independent claims, as well as further configurations to carry out the method and its embodiments, as explained.

Thus, wind turbine control slave unit can be implemented such that the signal processing unit is configured to calculate the speed control value based on PI processing the speed difference value, thus obtaining a first speed offset value, and PI processing the angle difference value, thus obtaining a second speed offset value, and adding the first and second offset value.

A wind turbine control device for use with the method of the invention, comprises a communication interface and a signal processing unit, wherein the communication interface is configured to receive a rotor rotational speed of at least a first and a second wind turbine over a communication link; the communication interface is configured to receive a rotor azimuth angle of a first and a second wind turbine over a communication link; the signal processing unit is configured to calculate a speed control value for the first wind turbine and at least a first speed control value for the second wind turbine, based on the rotor azimuth angles and rotor rotational speeds; the communication interface is configured to send the speed control value and the second speed control value over a communication link; wherein the signal processing unit is configured to calculate the speed control value such that the rotor azimuth angle of the first wind turbine and the rotor azimuth angle of the second wind turbine converge, and wherein the signal processing unit is configured to determine a synchronized rotor speed value based on a mean value of the rotor rotational speeds.

Again, embodiments of this aspect of the invention may comprise the features provided in the claims referring back to the independent claims, as well as further configurations to carry out the method and its embodiments, as explained.

A signal light control module for use with the wind turbine control master unit and/or for use with the wind turbine control device, comprises a communication interface and a signal processing unit, wherein the communication interface is configured to receive a synchronized rotor speed value and a synchronized azimuth angle value; the signal processing unit is configured to calculate a synchronized flash time value specifying a time at which a rotor blade tip of a connected wind turbine is at the top position, based on the synchronized rotor speed value and the synchronized azimuth angle value; the communication interface is configured to send the synchronized flash time value over a communication line. Again, the synchronized flash time value may be embodied to comprise a time stamp.

A wind turbine for use with the method, comprises a rotor, a communication interface and a local control unit, the communication interface is configured to receive a speed control value; the local control unit is configured to adjust the rotor speed according to the speed control value based on adding the speed control value to a speed setpoint value stored in the local control unit.

Embodiments of this aspect of the invention may comprise the features provided in the claims referring back to the independent claims, as well as further configurations to carry out the method and its embodiments, and interact with the control device, control master unit, control slave unit, as explained.

An embodiment of the wind turbine may further comprise a rotor blade, a signal light located at the blade tip, and a clock, wherein the communication interface is configured to receive a synchronized flash time value and the local control unit is configured to activate the signal light upon a clock in a wind turbine reaching the synchronized flash time value.

BRIEF DESCRIPTION OF THE DRAWINGS

The invention and its embodiments are explained in more detail below, using the following figures.

DETAILED DESCRIPTION OF INVENTION

Figure 1:
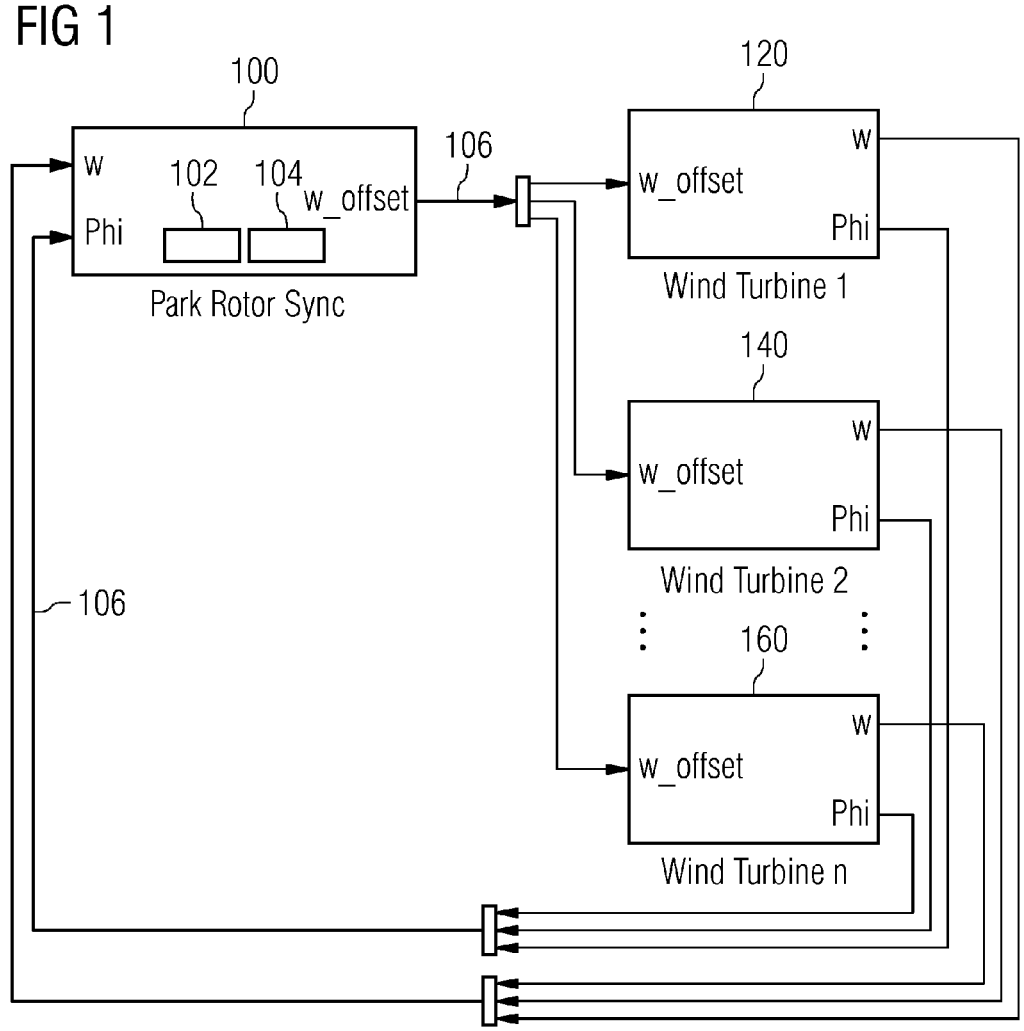
FIG. 1 shows a schematic overview of a first embodiment of the invention, using a central wind turbine control device and attached wind turbines.

FIG. 1 shows a schematic overview of a first embodiment of the invention, using a central wind turbine control device 100 and connected wind turbines 120, 140, 160.

Wind turbines 120, 140, 160 represent the wind turbine park for which the rotor blades of the wind turbines are to be kept in sync. Central wind turbine control device 100 may be located at a central control site, or at any of the wind turbines.

Central wind turbine control device 100 comprises communication interface 102 and signal processing unit 104. Communication interface 102, as well as the other communication interfaces described with regard to the embodiments described in this patent application, may take any form, ranging from simple input/output means like a processor input pin, or a bus, or more advanced forms, like serial interfaces, or computer networks, wireless or wire-bound. Signal processing unit 104, as well as the other signal processing units used in embodiments of the invention, may be implemented in various ways as well, comprising analog and/or digital circuitry, application specific integrated circuits (ASICs), or programmed general-purpose processors. Signals may include any form of analog or digital value. However, with present embodiments, signal processing unit 104, and components thereof, typically process binary numerical values.

Communication interfaces of wind turbines 120, 140, 160 (shown in FIG. 7; 702) and the communication interface 102 of central wind turbine control device 100 communicate via communication link 106.

Central wind turbine control device 100 determines the rotor rotational speed and rotor azimuth angle of each individual wind turbine by receiving these values from turbines 120, 140, 160 over communication link 106 and communication interface 102. Then, control device 100 calculates a speed control value for each individual wind turbine and sends the values to the wind turbines, again using communication link 106 and communication interface 102.

Each of wind turbines 120, 140, 160 adjusts its rotor speed according to the received speed control value with the help of local control means located at the individual wind turbine.

The speed control value may be an absolute value, or, as in the present case, the speed control value is an offset value which is added to an individual speed setpoint value stored in the wind turbine. In this case, each wind turbine adjusts its rotor speed to the setpoint value as modified by the offset value.

Wind turbine control device 100 calculates the speed control value such that, after a transient period in which the rotor azimuth angles of the wind turbines converge, the rotor azimuth angles are synchronized such that the rotor blades tips of the wind turbines all are in the top position at the same time, and the rotors rotate with the same speed. Due to the nature of the process, as a person skilled in the art will appreciate, "the same azimuth angle" and "the same rotational speed" also include ranges of small variations near zero.

Figure 2:
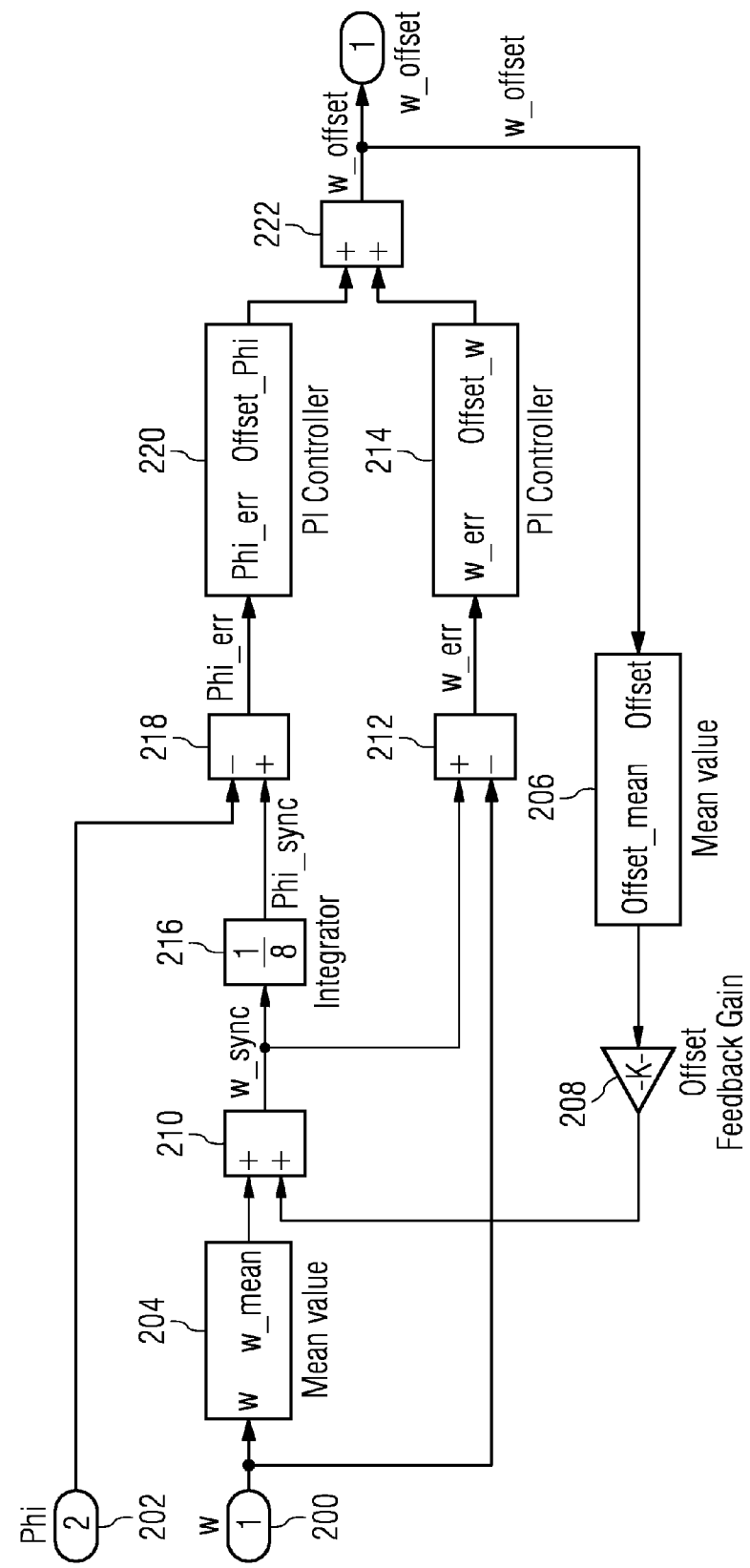
FIG. 2 shows an embodiment of the central wind turbine control device of FIG. 1.

FIG. 2 shows an embodiment of the central wind turbine control device as described with reference to FIG. 1. The control architecture presently being shown by functional components, each of which execute a method step, the person skilled in the art will acknowledge that these functional components may be implemented using analog and/or digital components, application specific integrated circuits (ASICs), or programmed general-purpose processors algorithmically executing the method steps respectively. Thus, functional components and the corresponding method steps are being referred to interchangeably hereinafter. With present embodiments, the signal processing unit is configured to implement the functional components or method steps appropriately.

In the step denoted by functional component 200, the rotor rotational speed is determined. At the same time, in step 202, the rotor azimuth angle is determined. In present embodiment, this is implemented by receiving the values over a communication interface.

Then, in step 204, the mean value of the current rotational speeds of all wind turbines is calculated. Further, in step 206, a mean value is calculated of the generated individual speed control values (speed offset control values) for all wind turbines, the control values having been captured at the output of the control device. Subsequently, the output of step/component 206 is then multiplied by a gain coefficient in step 208 and then added to the mean value resulting from step 204, in step 210. Thus, as an outcome of step 210, the synchronized rotor rotational speed value is obtained. As a result of the feedback loop that is provided by adding the mean speed control value multiplied with the gain factor, it is provided that the mean value of all speed control values is at or near zero.

In step 212, the synchronized rotor speed value is compared to the actual rotor speed value of each individual wind turbine, thus obtaining a speed error value, or speed difference value, for each turbine. By subjecting this speed difference value to PI processing in step 214 (either performed by a PI controller or an algorithmic simulation), the difference value is minimized and cast into a first speed offset value for each turbine.

By integrating the synchronized rotor rotational speed value in step 216, the synchronized rotor azimuth angle is obtained. Then, the synchronized azimuth angle value is compared to the actual azimuth angle value of each individual wind turbine in step 218, thus obtaining an azimuth error value, or azimuth difference value, for each turbine. By subjecting this azimuth difference value to PI processing in step 220 (again, either performed by a PI controller or an algorithmic simulation), the difference value is minimized and cast into a second speed offset value for each turbine.

The speed control value for each individual turbine is then obtained by adding the first and second speed offset values (or signals) in step 222. The speed control value for a turbine is added to the speed setpoint value stored in the respective wind turbine, and that turbine then adjusts its rotor speed according to the new setpoint. During a transient phase, individual rotor speeds and azimuth angles converge until they are in sync such that all blade tips are in a top position at the same time.

Figure 3:
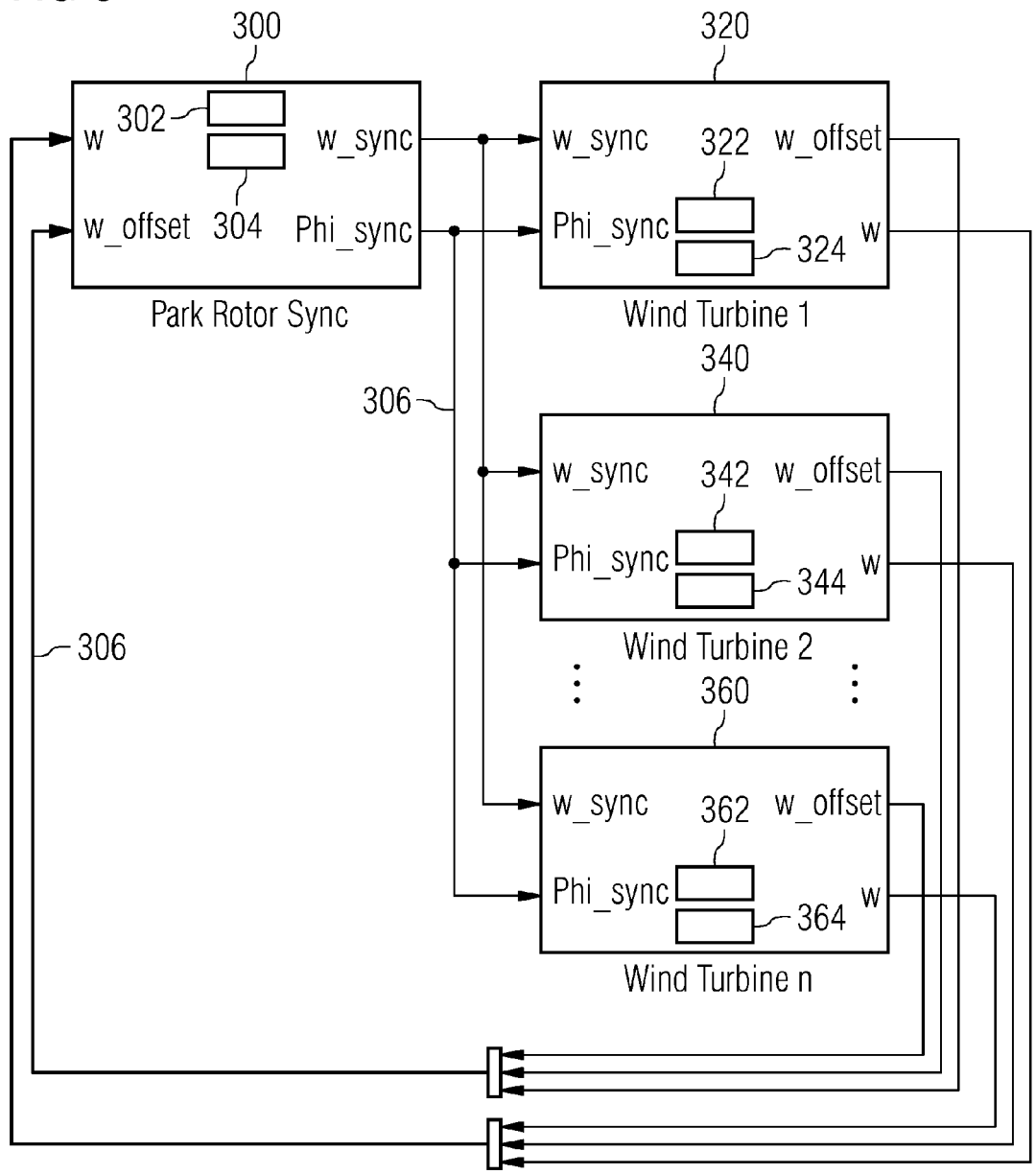
FIG. 3 shows a schematic overview of a second embodiment of the invention, using a wind turbine control master unit and attached wind turbine control slave units located in wind turbines.

FIG. 3 shows a schematic overview of a second embodiment of the invention, using a wind turbine control master unit and attached wind turbine control slave units located in wind turbines.

In contrast to a configuration with a central control device, this turbine control master unit is designed to work with a plurality of slave control units in a master/slave configuration. Master control unit 300 comprises communication interface 302 and signal processing unit 304, for which the description given with reference to FIGS. 1 and 2 applies correspondingly. However, master control unit 300 receives the individual rotor rotational speeds from the wind turbines as well as the individual speed control values, and calculates, from these values, the synchronized azimuth angle value and synchronized rotor speed value, and distributes (e.g., broadcasts) both of them to connected wind turbine control slave units 320, 340, 360 via communication line 306. Wind turbine control master unit may be located at a central control station or at any one of the wind turbines.

Wind turbine control slave units 320, 340, 360, each comprise communication interfaces 322, 342, 362 to receive the synchronized azimuth angle value and synchronized rotor speed value from wind turbine control master unit 300 via communication line 306. Slave units 320, 340, 360 further comprise signal processing units 324, 344, 364, respectively, to perform the data processing. The slave units may be located at the wind turbines, or in subsidiary control nodes, particularly in embodiments where more than one wind turbine is controlled by a slave unit.

In the configuration of this embodiment, certain parts of the control data processing that has been described with reference to FIG. 2 are moved from the central node to a plurality of peripheral nodes, the number of which may, but need not, immediately correspond to the number of controlled wind turbines. In this manner, scalability and maintainability of the overall system is improved in a significant manner as compared to a centralized approach.

The distribution of the processing steps that have been described with reference to FIG. 2 is now described in more detail with reference to FIGS. 4 and 5.

Figure 4:
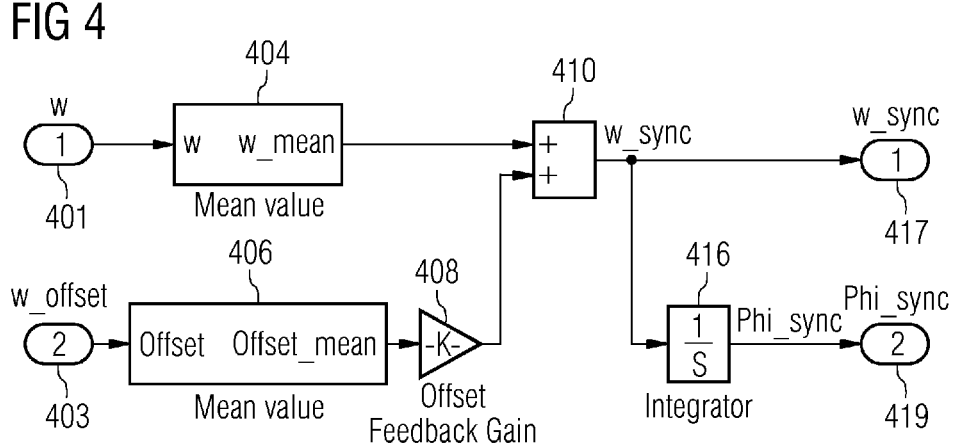
FIG. 4 shows an embodiment of the wind turbine control master unit of FIG. 3.
Figure 5:
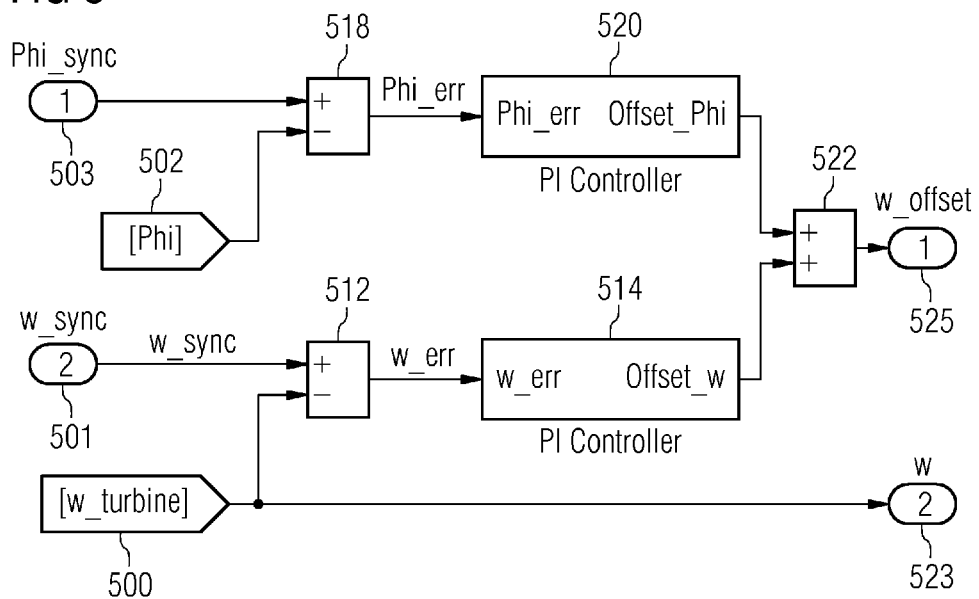
FIG. 5 shows an embodiment of the wind turbine control slave unit of FIG. 3.

FIG. 4 shows an embodiment of the wind turbine control master unit as described with reference to FIG. 3.

The individual rotor rotational speeds (step 401) and speed control values (i.e., speed offset values, step 403) are received by the control master unit via its communication interface and the communication line.

In step 404, the mean value of the current individual rotor speeds of all wind turbines is calculated. Further, in step 406, a mean value is calculated of the individual speed control values for the wind turbines. The output of step/component 406 is then multiplied by a gain coefficient in step 408 and then added to the mean value resulting from step 404, in step 410. Thus, as an outcome of step 410, the synchronized rotor rotational speed value is obtained. As a result of adding the mean speed control value multiplied with the gain factor, it is provided that the mean value of all speed control values is at or near zero. By integrating the synchronized rotor rotational speed value in step 416, the synchronized rotor azimuth angle is obtained.

Then, the calculated synchronized azimuth angle value and synchronized rotor speed value are sent to wind turbine control slave units 320, 340, 360 via communication interface 302 and communication line 306.

Subsequent control data processing in each of the slave units is now described with reference to FIG. 5, which shows an embodiment of the wind turbine control slave unit as described with reference to FIG. 3.

In step 500, the wind turbine control slave unit determines the rotational speed of the connected wind turbine, either by collecting the measurement value or by receiving the value from a local control unit in the wind turbine. (In the case of a plurality of wind turbines being connected, a plurality of rotational speeds is processed, and a number of speed offsets are generated, respectively, as described with reference to FIG. 2). Likewise, the control slave unit determines the rotor azimuth angle(s).

Further, the control slave unit receives the synchronized azimuth angle value (step 503) and synchronized rotor speed value (step 501) from wind turbine control master unit.

In step 512, the synchronized rotor speed value is compared to the actual rotor speed value of the wind turbine, thus obtaining a speed difference value. By subjecting this speed difference value to PI processing in step 514 (as described above), the difference value is minimized and cast into a first speed offset value.

Further, the synchronized azimuth angle value is compared to the actual azimuth angle value of each individual wind turbine in step 518, thus obtaining an azimuth difference value. By subjecting this azimuth difference value to PI processing in step 520, the difference value is minimized and cast into a second speed offset value for each turbine.

The speed control value is then obtained by adding the first and second speed offset value (or signals) in step 522. The speed control value is then transmitted to the local control unit of the turbine which adds it to the stored speed setpoint value, so that the local control unit then adjusts the rotor speed of the turbine according to the new setpoint.

Further, the rotor rotational speed (step 523) and speed control value (step 525) is sent to the wind turbine control master unit by the wind turbine control slave unit.

Figure 6:
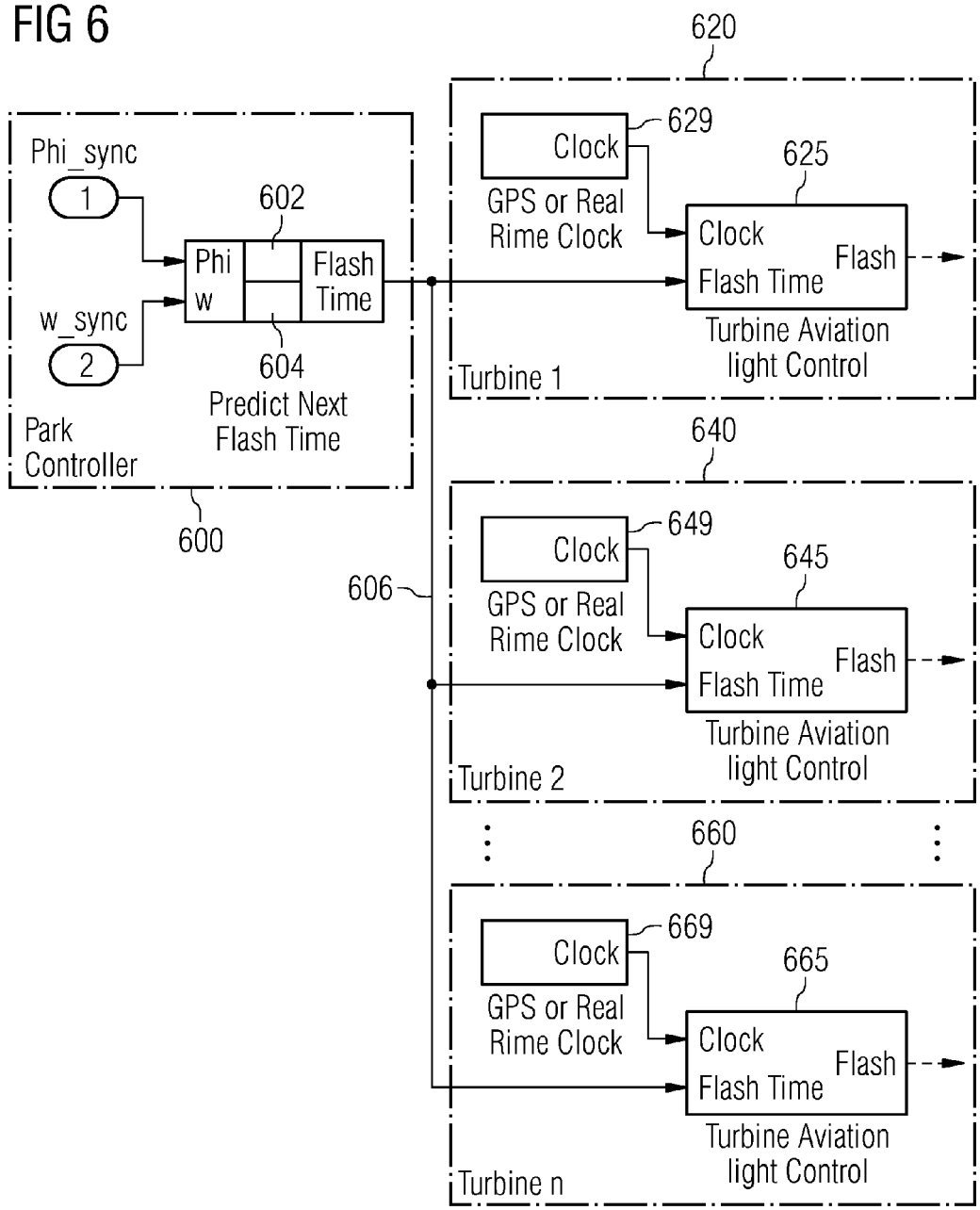
FIG. 6 shows a schematic overview of a third embodiment of the invention, with a signal light control module and attached wind turbines.

FIG. 6 shows a schematic overview of a third embodiment of the invention, with a signal light control module and attached wind turbines.

Given that, with the use of present invention, all individual rotor speeds and azimuth angles of the wind turbines in a wind turbine park are in sync, such that all blade tips are in a top position at the same time, the signal light control unit as described with reference to this figure can be combined with the embodiments of the present invention.

Signal light control unit 600 comprises a communication interface 602 and signal processing unit 604, which share the general types of implementation that were described above. Control unit 600, which might be integrated in any of the wind turbine control device, wind turbine control master unit, and wind turbine control slave units, receives the synchronized azimuth angle value and synchronized rotor speed value as inputs and predicts a time value at which a signal light is to be activated.

In this application, the signal light is to be activated at the time when the blade tips of all synchronized wind turbines 620, 640, 660 are in a top position. This enables to position the aviation signal light at the end of the blade tips, rather than on top of the nacelle, where the aviation signal light may interfere with air flow measurements.

By enabling the aviation signal light to be placed at the blade tip, the embodiment thus allows measurement interference to be reduced, and also allows the maximum height of the wind turbine to be indicated more accurately.

Consequently, control unit 600 calculates the synchronized flash time value to be the time value of the blade tips being in a top position. Local control units 625, 645, 665 in the wind turbines receive the synchronized flash time value transmitted by control unit 600 and, upon the time indicated by clock 629, 649, 669 being equal to the synchronized flash time value, activate the aviation signal light.

The synchronized flash time value may be a relative time value, in the form of a countdown starting value, or as in this embodiment an absolute time value (time stamp). The absolute time value can be, e.g., received from a real time clock or a GPS module in the turbine.

Figure 7:
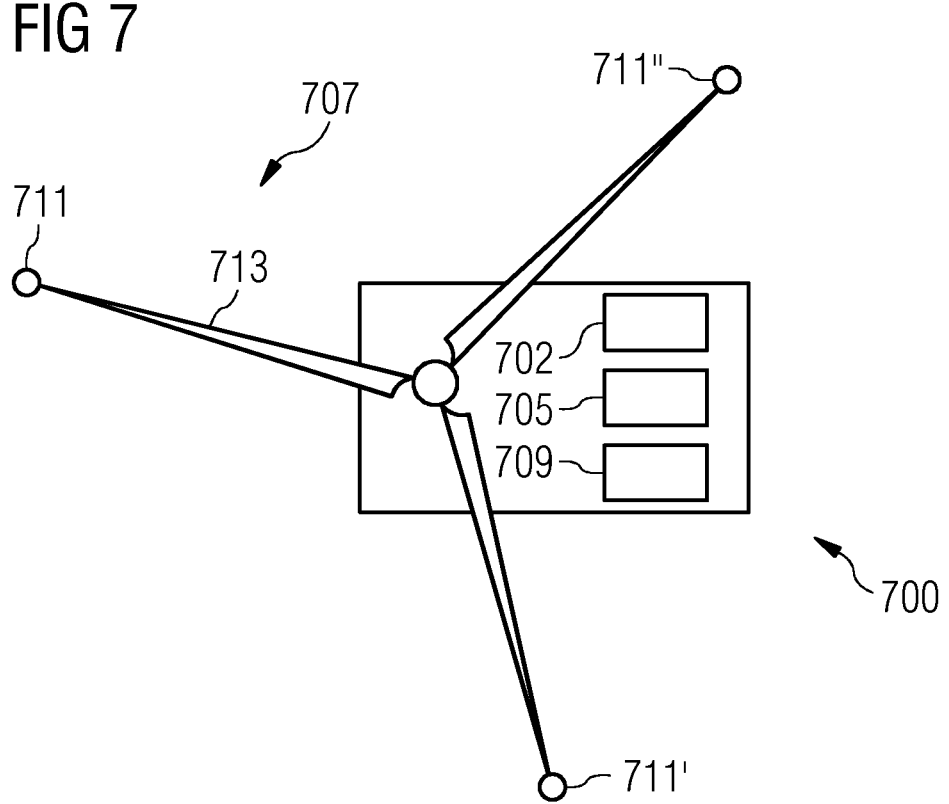
FIG. 7 shows a detailed semi-schematic view of a wind turbine relating to a further aspect of the invention.

FIG. 7 shows a detailed semi-schematic view of a wind turbine to be used with such an embodiment.

Wind turbine 700 comprises a rotor 707 with one or more blades 713. It is shown to have three blades since three-bladed rotors are the most common type. However, the invention can also be applied to any other rotor types like, e.g., two-bladed rotors. At the end of one or more blades 713 aviation signal lights 711, 711', 711" are located.

Wind turbine 700 further comprises communication interface 702 for receiving the synchronized flash time value, a clock 709, and local control unit 705 for comparing the synchronized flash time value with the time value delivered from clock 709.

The invention claimed is:

1. A wind turbine control master unit, comprising:
a communication interface and a signal processing unit, wherein
the communication interface is configured to receive a rotor rotational speed of at least a first and a second wind turbine over a communication link;
the signal processing unit is configured to determine a synchronized rotor speed value based on a mean value of the rotor rotational speeds;
the signal processing unit is configured to calculate a synchronized azimuth angle value based on integrating the synchronized rotor speed value; and
the communication interface is configured to send the synchronized rotor speed value and the synchronized azimuth angle value over a communication link.

2. The wind turbine control master unit according to claim 1, wherein the communication interface is further configured to receive speed control values of at least the first and second wind turbine over a communication link.

3. The wind turbine control master unit according to claim 1, wherein the signal processing unit is configured to add a mean value of the speed control values to the mean value of the individual rotor speeds resulting in the synchronized rotor speed value.

4. The wind turbine control master unit according to claim 2, wherein the signal processing unit is configured to add a mean value of the speed control values to the mean value of the individual rotor speeds resulting in the synchronized rotor speed value.

5. The wind turbine control master unit according to claim 1, for use with a wind turbine control slave unit, the slave unit comprising:
a communication interface and a signal processing unit, wherein
the communication interface is configured to receive a synchronized rotor speed value and a synchronized azimuth angle value over a communication link;
the signal processing unit is configured to obtain a rotor azimuth angle and a rotor rotational speed;

the signal processing unit is configured to compare the synchronized rotor speed value with the rotor rotational speed, thus obtaining a speed difference value;

the signal processing unit is configured to compare the synchronized azimuth angle value with the rotor azimuth angle, thus obtaining an angle difference value;

the signal processing unit is configured to calculate a speed control value based on the speed difference value and the angle difference value; and the communication interface is configured to send the speed control value and the rotor rotational speed over a communication link.

6. The wind turbine control master unit according to claim 5, wherein the signal processing unit of the slave unit is configured to calculate the speed control value based on PI processing the speed difference value, thus obtaining a first speed offset value, and PI processing the angle difference value, thus obtaining a second speed offset value, and adding the first and second offset value.

* * * * *